United States Patent Office 3,140,280
Patented July 7, 1964

3,140,280
AZO DYESTUFFS
Dietrich Liebsch, Leverkusen, and Detlef Delfs, Opladen, Germany, assignors to Farbenfabriken Bayer Aktiengesellschaft, Leverkusen, Germany, a corporation of Germany
No Drawing. Filed Mar. 11, 1960, Ser. No. 14,205
Claims priority, application Germany Mar. 14, 1959
3 Claims. (Cl. 260—153)

The present invention relates to new azo dyestuffs; more particularly it relates to monoazo dyestuffs of the formula

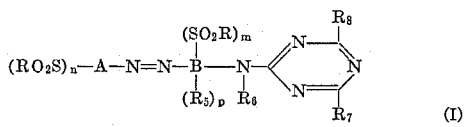

(I)

In this formula A and B denote benzene or naphthalene rings, R stands for the group —$CH_2$—$CH_2$—$OSO_3X$ or —NH—$R_1$—$OSO_3X$, wherein X stands for hydrogen or an alkali metal cation, $R_1$ denotes a bridge member with 2 or 3 carbon atoms between —N— and —O—, $R_5$ denotes hydrogen, alkyl or alkoxy, $R_6$ means hydrogen or lower alkyl, $R_7$ and $R_8$ mean —OH—, —$NH_2$ or substituted amino groups, $n$ stands for a whole number from 1 to 3, $m$ for 0 to 1 and $p$ for 1 or 2.

It is an object of the invention to provide new valuable azo dyestuffs; another object is the provision of azo dyestuffs which yield dyeings on cotton of excellent wet fastness properties. A further object is to provide azo dyestuffs with reactive groups, which make it possible to fix the dyestuff onto hydroxyl group-containing or amide group-containing fibre material by chemical linkage.

In accordance with the invention it has been found that valuable new monoazo dyestuffs are obtainable by coupling, in the p-position to the amino group, diazotized aminobenzene or aminonaphthalene having 1 to 3 sulfonic acid groups, with an aminobenzene or aminonaphthalene which may have a sulfonic acid group and/or one or two alkyl or alkoxy groups in the aromatic nucleus, by reacting 1 mol of the aminoazo compound thus obtained with 1 mol of 2,4,6-trichloro-1,3,5-triazine, subsequently exchanging the two remaining chlorine atoms in the primary condensation product for —OH, $NH_2$ or substituted amino groups, and by converting the sulfonic acid groups in the dyestuffs thus obtained according to known methods into groupings of the formula

—$SO_2R$

In this formula R denotes —$CH_2$—$CH_2$—$OSO_3X$ or —NH—$R_1$—$OSO_3X$ wherein X stands for hydrogen or an alkali metal cation, and $R_1$ denotes a bridge member with 2 or 3 carbon atoms between —N— and —O—.

In the aforesaid groupings $R_1$ may be a straight-chain or branched alkylene radical with 2 or 3 carbon atoms between —N— and —O—.

Diazo components suitable for the process are for example: 1-aminobenzene-4-sulfonic acid, 1-aminobenzene-3-sulfonic acid, 1-aminonaphthalene-4-sulfonic acid, 2-aminonaphthalene-6-sulfonic acid or 2-aminonaphthalene-4,8- and -6,8-disulfonic acid.

As coupling components there may be used inter alia: 1-amino-2-methoxybenzene, 1-amino-2-methylbenzene, 1-amino-3-methylbenzene, 1-amino-2,5-dimethylbenzene, 1-amino-2-methoxy-5-methylbenzene, 1-amino-2,5-dimethoxybenzene, 1-aminonaphthalene, 1-aminonaphthalene-7-sulfonic acid as well as N-mono-substitution products of amines such as N-ethylaminobenzene, or aminobenzene-N-methane-sulfonic acid, the methane-sulfonic acid group in the latter compound being split off after coupling by alkaline saponification.

For the reaction with 2,4,6-trichloro-1,3,5-triazine the aminomonoazo compound of the formula

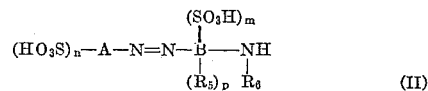

(II)

wherein A, B, $R_5$, $R_6$, $m$, $n$, and $p$ have the above meaning, is preferably dissolved neutral with sodium carbonate and the solution added dropwise to a suspension of the cyanuric chloride in ice water/acetone, the pH value being kept within the acetic acid range and the temperature between 0 and 5° C. The chlorine atoms remaining in the triazine ring may subsequently be exchanged for a hydroxyl group by heating for several hours with sodium hydroxide solution, and/or for amino or substituted amino groups by reacting with ammonia or amines which may have dyestuff character; suitable amines are, inter alia, methylamine, dimethylamine, hydroxyethylamine, tert. butylamine, aminobenzene, aminobenzene sulfonic acid, 1-amino-4-methylbenzene, 1-amino-2,6-diethylbenzene, aminonaphthalene, aminonaphthalene sulfonic acid and so on. The reaction of trichlorotriazine with the aminomonoazo compound is preferably carried out in an equimolar ratio. In a similar way two or three moles of the aminoazo compound (II) can be condensed with cyanuric chloride.

The conversion of the sulfonic acid groups present in the dyestuff molecule into groupings —$SO_2R$ of the above mentioned definition is carried out by various methods known as such. Thus, sulfonic acid groups are reduced for conversion into the grouping

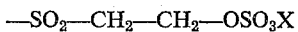

to give sulfinic acids or their sodium salts, the latter reacted with β-chlorethylalcohol or ethylene oxide, and the hydroxy groups then esterified with sulfuric acid, sulfuric acid esters or their metal salts thus being formed. For conversion into the grouping

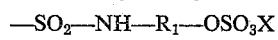

of the above definition, the sulfonic acid groups in the dry sulfo group-containing dyestuffs are converted by treatment with thionyl chloride and chlorosulfonic acid into the corresponding sulfochlorides and the latter condensed, preferably in a weakly alkaline medium, with, for example, the sulfuric acid semiesters of alkanolamines such as ethanolamine. A modified method consists in converting the sulfonic acid groups in the sulfonic acid group-containing dyestuffs into sulfochloride groups, reacting the latter first with alkanolamines (hydroxyalkylamines) and esterifying the hydroxalkylsulfonamides thus obtained with, for example, sulfuric acid or monohydrate.

According to another process, the new dyestuffs are also obtainable by first converting the sulphonic acid-containing monoaminoazo compounds without modifying the free amino group, with thionyl chloride and chlorosulfonic acid into the sulphochlorides and reacting the latter with the sulphuric acid semiesters of ethanolamine as described above. The dyestuff intermediate products thus obtained which, incidentally, as so-called reactive dyestuffs already yield on cotton dyeings of outstanding fastness to washing, are excellently water-soluble; similarly to the monoazo dyestuff-sulphonic acids, they may easily be condensed with 2,4,6-trichloro-1,3,5-triazine. The hydrolysis of the two remaining chlorine atoms of the triazinyl ring is in many cases possible in a weakly alkaline medium without simultaneous saponification of the sulphuric acid ester groups. If for technical reasons the reaction cannot be carried out while maintaining definite pH values and temperatures, it is also possible to hydrolyse more strongly and to re-esterify any saponified sulphuric acid ester groups in concentrated sulphuric acid after isolation and drying of the dyestuff.

Another method of producing the dyestuffs consists in converting the sulphochlorides obtained by reaction of the sulphonic acid group-containing aminomonoazo compounds with thionyl chloride and chlorosulphonic acid, with alkanolamines, for example ethanolamine, condensing the preliminary dyestuff products thus obtained with 2,4,6-trichloro-1,3,5-triazine, exchanging the remaining chlorine atoms in the triazine ring for —OH, —$NH_2$ or substituted amino groups in the manner described above and, finally, esterifying the hydroxy groups with sulphuric acid. For the conversion of the aminoazo compounds with trichlorotriazine, the alkanolamides are dissolved in the requisite amount of aqueous alkali as sodium salts and caused to react by mixing them with an excess of cyanuric chloride solution in acetone, the liberated hydrochloric acid being neutralised by the addition of further alkali, the dyestuff sulphonic acid-alkanolamides kept dissolved and the excess triazinyl-chlorine atoms hydrolysed.

According to a further alternative of the invention, the dyestuffs of the general Formula I which contain no sulphonic acid groups in the benzene or naphthalene radical B are also obtainable by converting the sulphonic acid groups in the starting component A into sulphochloride groups, condensing the latter with alkanolamines and esterifying with sulphuric acid, diazotising the diazo component thus obtained, combining it with the coupling component B and, finally, condensing the aminoazo compound with 2,4,6-trichloro-1,3,5-triazine. The remaining chlorine atoms in the triazine ring are then hydrolysed or exchanged for amino groups by reaction with ammonia or amines. In this case, too, any saponified sulphuric acid ester groups may be re-esterified. The sulpho groups in the preliminary dyestuff products may also be converted into sulphinic acids or their sodium salts by reduction, then reacted with β-chlorethylalcohol or ethylene oxide, and the hydroxy groups in the β-position of the oxalkyl sulphones thus obtainable esterified with sulphuric acid.

The new dyestuffs are readily water-soluble. They are suitable for the dyeing and printing of hydroxyl-group-containing materials, particularly for the dyeing and printing of fibres and fabrics of natural and regenerated cellulose. Dyeings and prints of outstanding fastness to washing and boiling are obtained on these materials by applying the dyestuffs to the dyeing material and subjecting the dyed material to the action of acid-binding agents, preferably at an elevated temperature. In addition to good fastness to wetting, the dyeings and prints show also a good fastness to chlorine.

For dyeing the dyestuffs are preferably used in an aqueous solution to which there are added alkaline substances such as alkali metal hydroxide or alkali metal carbonate or compounds changing into alkaline substances such as alkali metal bicarbonate. To the solution there may be added further auxiliaries which, however, do not react with the dyestuffs in an undesirable manner. Examples of such additives are surface-active substances such as alkyl sulphates or substances preventing the migration of the dyestuff, or dyeing auxiliaries such as urea (for improving the solubility and fixation of the dyestuffs), or inert thickeners such as oil-in-water emulsions, tragacanth, starch, alginate or methylcellulose.

The solutions or pastes thus prepared are applied to the dyeing material, for example by padding on the foulard or printing, and then heated to an elevated temperature, preferably 40–150° C., for some time. Heating may be effected in the hot flue in a steaming apparatus, on heated rollers or by introducing the material into heated concentrated salt baths, either or alone or consecutively in any sequence.

When using a padding or dyeing solution without alkali the dry material is subsequently passed through an alkaline solution to which commonsalt or Glauber salt has been added. Addition of salt prevents migration of the dyestuff from the fibre.

The dyeing material may also be pre-treated with one of the aforesaid acid-binding agents, then treated with a solution or paste of the dyestuff and, finally, fixed at an elevated temperature as described above.

After fixation, the dyeing material is rinsed hot and, if required by the intended use of the dyed material, finally soaped, not sufficiently fixed dyestuff residues being thus removed. Dyeings of outstanding fastness to wetting are thus obtained, although the dyestuffs preferably used have no or only a slight affinity to the dyeing material.

For the printing of hydroxyl-group-containing materials there is used a printing paste consisting of the dyestuff solution, a thickener such as sodium alginate and an alkaline compound or a compound splitting off alkali upon heating such as sodium carbonate, potassium carbonate or sodium bicarbonate, the printed material is rinsed and, if desired, finally soaped.

Amide-group-containing materials such as wool, silk and the like may also be dyed or printed according to known methods.

The following examples are given for the purpose of illustrating the invention.

*Example 1*

(a) 19.4 g. of fresh cyanuric chloride are dissolved in 200 ml. of acetone and reprecipitated in the fine state required for a smooth reaction by pouring the solution into 400 ml. of ice-water. To this suspension there is added dropwise with external cooling within an hour a neutral solution of 42.1 g. of the aminoazo dyestuff obtainable by coupling diazotized 2-aminonaphthalene-4,8-disulphonic acid with 1-amino-3-methylbenzene, in 500 ml. of water and the requisite amount of sodium carbonate; the temperature is kept between 0 and 5° C. and the pH value between 4 and 6 by the simultaneous dropwise addition of a 10% sodium carbonate solution. The reaction mixture is after-stirred under the same conditions for ½ to 2 hours, until a sample no further exhibits any diazotizable amine. The mixture is then rendered strongly alkaline by the addition of 30 g. of sodium hydroxide solution (38° Bé.), heated until the acetone has distilled off and then stirred at 80–85° C. for 4–5 hours. The product is then free of organic chlorine and is precipitated by the addition of 10% potassium chloride, stirred cold and isolated.

The salt-containing sharply dried dyestuff (about 0.09 mol) is ground and slowly introduced with stirring into 400 g. of chlorosulphonic acid. When the evolution of hydrochloric acid accompanied with foaming has ceased, 30 g. of thionyl chloride are added dropwise, the mixture is slowly heated to 100° C. and stirred at this temperature for 3 hours. The reaction mixture is then cooled and poured on 2 kg. of ice with vigorous stirring. The precipitated sulphochloride is immediately filtered off with suction while ice-cold, washed three times with 100 ml.-portions of ice-water until acid-free and introduced moist into a vigorously stirred solution of 51 g. of β-hydroxyethylamine-sulphuric acid semiester in 1.5 litre of water previously adjusted to a pH 9–9.5 by means of sodium hydroxide solution. The mixture is heated to 45° C. within an hour and a pH value of 9 is maintained by the dropwise addition or 2 N sodium hydroxide solution, until the solution is clear. The solution is after-stirred for 1–2 hours, a 15% potassium chloride solution is added, the mixture is stirred cold and rendered neutral by the dropwise addition of hydrochloric acid. After filtering off with suction, the product is washed with a 15% potassium chloride solution and dried under vacuum at 45–50° C.

The dyestuff readily dissolves in water with an orange-red colour. When padding fabrics from natural or regenerated cellulose with a solution of 40 g. of dyestuff, 100 g. of urea, 0.5 g. of Turkey-red oil and 40 g. of sodium hydroxide solution (38° Bé.), and heating to 120° C. for 5–10 minutes or steaming in a steaming apparatus for 3–10 minutes, there are obtained, after brief rinsing and soaping, golden yellow dyeings of good fastness to light and chlorine and excellent fastness to washing and boiling.

(b) In a similar manner the monoaminoazo dyestuffs obtainable by coupling diazotized 2-aminonaphthalene-4,8-disulphonic acid with 1-amino-2-methoxybenzene; 2-aminonaphthalene-6,8-disulphonic acid with 1-amino-2-methoxy-5-methylbenzene; 2-aminonaphthalene-6-sulphonic acid with 1-amino-3-methylbenzene; 2-aminonaphthalene-4,8-disulphonic acid with 1-N-ethylamino-3-methylbenzene, can be condensed with cyanuric chloride and, after hydrolysis of the chlorine atoms at the triazine ring, converted via the dyestuff sulphochlorides into the corresponding esterified dyestuffs which may be dyed on cotton in the manner indicated above to yield yellow to orange shades of very good fastness to washing.

Example 2

18.5 g. of fresh cyanuric chloride are condensed as described in Example 1(a) with 42.1 g. of the aminoazo dyestuff obtainable by coupling diazotized 2-aminonaphthalene-4,8-disulphonic acid with 1-amino-3-methylbenzene. The mixture is rendered neutral, treated with 30 g. of crystalline sodium acetate and a solution of 17.3 g. of 1-aminobenzene-4-sulphonic acid and 6 g. of anhydrous sodium carbonate in 120 ml. of water and stirred at room temperature for 3–5 hours. The condensation is completed by heating to 40° C. and when no further aromatic amine is detectable, the third chlorine atom of the triazine ring is hydrolytically removed by the addition of 100 ml. of 2 N sodium hydroxide solution and heating to 85° C. for 3–4 hours.

Instead of replacing the third chlorine atom by the hydroxyl group, it may also be exchanged for other radicals, for example by reaction with $NH_3$, ethanolamine or a second mol of 1-aminobenzene-4-sulphonic acid.

The second and third chlorine atom of the triazinyl radical may as well be replaced by any other aliphatic and aromatic amines containing or not containing sulfonic acid.

The dyestuff is isolated by salting out in acetic acid and, after drying, converted in the same manner to the dyestuff described in Example 1 in 400 g. of chlorosulphonic acid with 60 g. of thionyl chloride into the trisulphochloride which is reacted with 76 g. of β-hydroxyethylamine-sulphuric acid ester in 500 ml. of water to give the final product.

Instead of 1-aminobenzene-4-sulphonic acid, the cyanuric chloride may also be condensed in a second step with a second mol of the dyestuff formed by coupling diazotized 2-aminonaphthalene-4,8-disulphonic acid with 1-amino-3-methylbenzene or with other amino-group-containing dyestuffs.

Example 3

46.7 g. of the aminoazo dyestuff obtained by acid coupling of diazotized 2-aminonaphthalene-4,8-disulphonic acid with 1-amino-2,5-dimethoxybenzene are introduced with cooling into 500 g. of chlorosulphonic acid. When the evolution of hydrochloric acid accompanied by foaming has ceased, 50 g. of thionyl chloride are added dropwise and the reaction mixture is heated to 80° C. The mixture is stirred at 78–80° C. for an hour, cooled and decomposed with an excess of ice while vigorously stirring. The precipitated sulphochloride is immediately filtered off with suction while ice-cold, washed twice with 100 ml.-portions of ice-water and introduced moist into a vigorously stirred solution of 56 g. of β-hydroxyethylamine-sulphuric acid ester in 300 ml. of water. By means of a sodium hydroxide solution a pH value of 9–9.5 is adjusted and maintained until the sulphochloride has dissolved upon slowly heating to 45° C. The mixture is after-stirred for an hour, cooled, rendered acetic and the dyestuff precipitated by saturation with potassium chloride. After filtering off with suction and washing with saturated potassium chloride solution, the dyestuff content is ascertained by diazotization of a sample and the dyestuff is condensed with the calculated amount of cyanuric chloride as described in Example 1. This requires 19.4 g. of cyanuric chloride which are dissolved in 200 ml. of acetone and re-precipitated in a finely divided state by pouring into 400 ml. of ice-water. For this precipitation, a neutral solution of 71.3 g. of the above dyestuff (100% referred to free acid) are added dropwise with cooling to 500 ml. of water and the requisite amount of sodium carbonate within an hour. The temperature must be maintained between 0 and 5° C., the pH value, by means of sodium carbonate solution, between 4 and 6, until diazotizable amine can no longer be detected. The product is then rendered neutral, 11 g. of sodium carbonate are added, the mixture, after distilling off the acetone, is stirred at 80° C. for 2 hours, 11 g. of sodium carbonate are again added and stirring is continued at 80° C. for 2 hours. The hydrolysis of the chlorine atoms at the cyanuric ring is then completed, whilst the sulphuric acid ester groups essentially remain intact. The product is salted out, stirred cold, neutralised and the dyestuff is isolated which when dyed on cotton with 40 g./litre in the manner described in Example 1 yields reddish brown dyeings of outstanding fastness to washing and boiling.

The aminolysis of the chlorine atoms in the triazinyl radical proceeds under milder conditions than hydrolysis. Therefore the above described primary condensation product from the aminoazo dyestuff sulfonic acid ethanolamide sulfuric acid ester and cyanuric chloride can be reacted in a very smooth reaction with amines to form a reactive dyestuff similar to that obtained in hydrolysis. For this purpose for instance 18.6 g. of aniline dissolved in 200 ml. of 2 N hydrochloric acid are added to the dyestuff suspension which is heated to 80° C. for 10 hours while maintaining the pH value always weakly acetic acid by the dropwise addition of sodium carbonate solution. The dyestuff is then substantially free of chlorine and the amine reaction only weak. The dyestuff is salted out in the heat and isolated after cooling. When dried by the method described in Example 1 the dyestuff dyes cotton red shades of good fastness to washing and boiling.

Instead of aniline, substituted aromatic amines as well as aliphatic amines for instance methylamine, dimethylamine, hydroxyethylamine and ammonia may likewise be used.

In a similar manner other aminoazo dyestuffs obtainable, for example, by coupling of diazotized 2-aminonaphthalene-6,8-disulphonic acid with 1-amino-2,5-dimethoxybenzene or of diazotized 2-aminonaphthalene-4,8-disulphonic acid with 1-amino-2-methoxy-5-methylbenzene, can be converted into red or orange esterified dyestuffs which on cotton yield dyeings of outstanding fastness to washing.

Example 4

42.1 g. of the aminoazo dyestuff obtainable by acid coupling of diazotized 2-aminonaphthalene-6,8-disulphonic acid with 1-amino-3-methylbenzene are converted into the disulphochloride in the manner described in Example 3, washed neutral with ice-water and introduced into a vigorously stirred solution of 30.5 g. of ethanolamine in 500 ml. of ice-water. The mixture is brought to room temperature while stirring, then slowly heated to 50–60° C. and kept at this temperature for 3 hours, in order to complete the reaction whereby the mixture must always remain strongly alkaline. The hot suspension is then filtered off with suction, thoroughly washed with hot water, dissolved in 100 ml. of a 2 N sodium hydroxide solution and 400 ml. of water and cooled to 0° C. To this solution there are simultaneously added a further 200 g. of a 2 N sodium hydroxide solution and a solution of 28 g. of cyanuric chloride in 250 ml. of acetone and the temperature is raised to room temperature within an hour. A further 18.5 g. of cyanuric chloride in 150 ml. of acetone are then added dropwise, the mixture is heated until the whole of the acetone has distilled off, and stirred at 80° C. for 3–4 hours, a further 175 ml. of a 2 N hydroxide solution being added dropwise, in order to keep the dyestuff dissolved. Finally, the mixture is rendered acetic, filtered off with suction while hot and thoroughly washed with hot water. After drying, the dyestuff thus obtained is introduced into 200 ml. of sulphuric acid monohydrate in the cold and stirred at room temperature for 5 hours. The product is poured onto ice, filtered off with suction from the excess acid, the filter cake, without washing, suspended in 300 ml. of water and rendered neutral with sodium hydroxide solution while cooling. The dyestuff is then completely salted out by the further addition of salt; filtered off with suction and dried. The dyestuff thus obtained can be fixed on cotton fabrics in the manner described above to give reddish yellow dyeings of outstanding fastness to washing.

Example 5

30.3 g. of 2-naphthylamine-4,8-disulphonic acid are slowly introduced with cooling into 300 g. of chlorosulphonic acid and stirred at 80° C. for 3 hours. After cooling, the chlorosulphonic acid is decomposed in an excess of ice with good stirring, the precipitated sulphochloride filtered off with suction and washed three times with 100 ml.-portions of ice-water. The almost acid-free sulphochloride is introduced into a solution of 50 g. of ethanolamine-sulphuric acid ester in 500 ml. of water adjusted to a pH value of 9 with sodium hydroxide solution, the mixture is heated to 45° C. with stirring and kept at a pH 9 by the dropwise addition of sodium hydroxide solution, until the whole has completely dissolved. The solution is after-stirred for 2 hours and 2-naphthylamine - 4,8 - disulphonic acid-ethanolamide-sulphuric acid ester is isolated by the addition of salt. After washing once with a 20% sodium chloride solution, the amine is dissolved in 500 ml. of water without drying, rendered acid to Congo with hydrochloric acid and, after the addition of 25 ml. of concentrated hydrochloric acid, diazotized with a 10% sodium nitrite solution, until the reaction to potassium - iodide - starch remains constant. After stirring for another hour, the equimolar amount of 1-amino-3-methylbenzene corresponding to the nitrite used is added to the mixture and the excess acid is neutralised by the addition of sodium carbonate, until coupling, acid to Congo, sets in vigorously. The reaction is completed in acetic acid by stirring overnight, the mixture then cooled to 0° C. and condensed with 18.5 g. of cyanuric chloride in the manner described in Example 3, and the excess chlorine atoms are substituted by hydroxyl groups by mild hydrolysis. The dyestuff containing no further organic chlorine, is precipitated by cooling and the addition of salt and is identical with the product obtainable according to Example 1.

Since the aminolysis of the residual chlorine atoms of the triazinyl radical proceeds under milder conditions than hydrolysis, the above said primary condensation product from the amino azo dyestuff sulfonic acid ethanolamide sulfuric acid ester and cyanuric chloride, can be reacted in a smooth reaction with amines, as described in Example 3.

Example 6

30.3 g. of 2-naphthylamine-4,8-disulphonic acid are converted into the disulphochloride in the manner described in Example 5 and the latter, after filtering off with suction, washed acid-free with ice-water. It is then suspended in 100 ml. of ice-water and a solution of 30 g. of crystalline sodium sulphite in 80 ml. of water is added thereto, the mixture is slowly heated to 40° C. and stirred at this temperature for 2 hours, the solution being kept weakly acetic by the dropwise addition of sodium hydroxide solution. The mixture is stirred overnight and 2-naphthylamine-4,8-disulphinic acid is precipitated acid to Congo by the addition of salt. After filtering off with suction and washing with a 15% sodium chloride solution, the product is dissolved neutral with sodium carbonate in 200 ml. of water, 16 g. of ethylenechlorohydrin are added and the mixture is boiled under reflux for 8 hours, only a small amount of sodium hydroxide solution being required for keeping the solution neutral. The 2-naphthylamine-4,8-dihydroxyethylsulphone thus formed is isolated by the addition of salt in acetic acid and after drying esterified with sulphuric acid monohydrate as indicated in Example 4. The filter cake is then dissolved in 500 ml. of water as described in Example 5, diazotized, coupled with 1-amino-3-methylbenzene and condensed with cyanuric chloride. The dyestuff can be dyed on cotton in the manner described above and yields a reddish yellow shade of good fastness to wetting.

Example 7

18.5 g. of fresh cyanuric chloride are condensed as described in Example 1(a) with 42.1 g. of the aminoazo dyestuff prepared by coupling diazotized 2-aminonaphthalene-4,8-disulfonic acid with 1-amino-3-methylbenzene. The mixture is then neutralized and a neutral solution of 0.22 mol of 3-aminobenzene sulfonic acid in 200 ml. of water is added. The mixture is heated to 35 to 40° C. for 4 to 6 hours while maintaining a pH value of 7.5 to 8 by addition of 40 ml. of a sodium carbonate solution (15%). Thereupon the acetone is distilled off, the mixture heated to 90 to 95° C. for 12 hours and the pH value kept at 9 by the addition of further 60 g. of sodium carbonate. The water is replenished at the rate at which it evaporates. After the reaction the dyestuff is free of organic chlorine. The dyestuff is isolated in the heat by addition of potassium chloride (15%). The isolated dyestuff which is dried at a high temperature has a content of about 0.093 mol and is introduced into 800 g. of chlorosulfuric acid. When the evolution of hydrochloric acid accompanied with foaming has ceased, 240 g. of thionylchloride are added dropwise within one hour and the mixture is stirred at 80° C. for 2 hours. The mixture is then cooled and poured onto about 3.5 kg. of ice with vigorous stirring and the sulfochloride which can readily be filtered is filtered off with suction, washed five times with 200 ml. of ice water until acid-free and introduced while moist into a vigorously stirred solution of 100 g. of β-hydroxy-ethylamine sulfuric acid semi-ester in 1 l. of water previously adjusted to a pH value of 9 by means of sodium hydroxide solution. The mixture is slowly heated to 45° C. and a pH value of 9 to 10 is maintained by the dropwise addition of about 55 g. of sodium hydroxide solution (45%) until the substance has been dissolved. After stirring for 2 hours 1.6 l. of saturated potassium chloride solution are added, the precipitated dyestuff is filtered off with suction and dried. 0.075 to 0.08 mol of the dyestuff is obtained which readily dissolves in water and dyes cotton by the method indicated in Example 1 reddish yellow shades of excellent fastness to washing and boiling.

18.5 g. of fresh cyanuric chloride are dissolved in 10 ml. of acetone and the solution is stirred into 250 ml. of ice water. After the addition of 17.4 g. of 3-aminobenzene sulfonic acid, dissolved neutral in 100 ml. of water of pH valve of 6 to 6.5 is maintained at 0 to 5° C. by the dropwise addition of sodium carbonate solution until no further aromatic amine is detectable after 15 minutes. Thereupon 42.1 g. (calculated on 100%) of the monoazo dyestuff prepared by coupling diazotized 2-aminonapthalene-4,8-disulfonic acid with 1-amino-3-methylbenzene, are dissolved neutral in 250 ml. of water, added to the above mixture which is heated to 35 to 40° C. while maintaining a pH value of 7.5 to 8 by the dropwise addition of sodium carbonate until aromatic amine is no longer detectable. 14 g. (0.15 mol) of aniline are added to the mixture which is heated to 90 C. for 5 to 6 hours while maintaining a neutral pH value by the addition of further amounts of sodium carbonate. The dyestuff is separated almost completely in the heat by addition of 100 g. of postassium chloride, filtered off with suction and dried.

The isolated dyestuff which is dried at a high temperature is introduced into 800 g. of chlorosulfonic acid. When the evolution of hydrochloric acid accompanied with foaming has ceased 240 g. of thionylchloride are added dropwise within one hour and the mixture is stirred at 80° C. for 2 hours. The mixture is cooled and poured on about 3.5 kg. of ice with vigorous stirring. The well filterable sulfochloride is filtered off with suction, washed five times with 200 ml. of ice water until acid-free and introduced moist into a vigorously stirred solution of 100 g. of β-hydroxyethylamin sulfuric acid semi-ester in 1 l. of water previously adjusted to a pH value of 9 by means of sodium hydroxide solution. The mixture is slowly heated to 45° C. and a pH value of 9 to 10 is maintained by the dropwise addition to about 55 g. of sodium carbonate solution (45%) until the substance has been dissolved. After stirring for 2 hours the dyestuff is separated by adding 1.6 l. of saturated potassium chloride solution, the dyestuff is filtered off with suction and dried. 0.075 to 0.08 mol of the dyestuff is obtained which readily dissolves in water and dyes cotton by the method described in Example 1, reddish yellow shades of excellent fastness to wash and boiling.

Example 9

The suspension of the dyestuff intermediate obtained according to Example 1 by condensing the aminoazo dyestuff from 2-aminonaphthalene-6,8-disulfonic acid and 1-amino-3-methyl-5-methoxybenzene with equimolecular amounts of cyanuric chloride, is contacted with a solution of 24.2 g. of 1-amino-2,6-dimethylbenzene in 200 ml. of 2 N hydrochloric acid, heated to 80° C. for 12 hours and the pH value is always kept slightly acetic acid by the addition of sodium carbonate solution (15%). The content of the solution of diazotized amine is then only low and the dyestuff substantially free of organic chlorine. The dyestuff sulfonic acid formed preciptates almost completely upon addition of the salt and is converted into the final dyestuff after drying as described in Example 7 by conversion into the sulfochloride and reaction with β-hydroxyethylamine sulfuric acid semi-ester.

By following the dyeing method indicated in Example 1 the dyestuff thus obtained yields orange shades of good fastness to wet processing. Similar dyestuffs are obtained by replacing 1-amino-2,6-dimethylaniline by other amines, for instance by 1-amino-2-methyl-6-ethylbenzene, 1-amino-2,6-diisopropylbenzene or tertiary butylamine.

The incorporation of further sulfo groups into the radicals of the aromatic amines which are linked with the triazinyl radical, in the reaction leading to the formation of sulfochloride and thereby the production of further reactive groups in the molecule can be accomplished in particular when carrying out the sulfochlorination at higher temperatures.

Example 10

18.5 g. of fresh cyanuric chloride are dissolved in 100 ml. of acetone and the solution is stirred into 250 ml. of ice water. A solution of 14 g. of crystallized sodium acetate in 50 ml. of water and thereafter 17.4 g. of 4-aminobenzene sulfonic acid dissolved neutral in 100 ml. of water with 2 N sodium hydoxide solution are run into the suspension. The mixture is stirred at 0 to 5° C. until aromatic amine i sno longer detectable after about 15 minutes and thereupon the neutral solution of 38.5 g. of 4-amino-2' 3-dimethyl-azobenzene-4' 5-disulfonic acid, prepared by coupling diazotised 1-amino-2-methylbenzene-4-sulfonic acid upon 1 amino-2-methylbenzene and subsequent sulfonation, in 250 ml. of water is added. While maintaining an acetic acid reaction the mixture is heated to 35 to 40° C. until no further aromatic amine is detectable after 1 to 2 hours. 10 g. of aniline are then added to the reaction mixture which is maintained weakly acetic acid by the dropwise addition of sodium carbonate solution and heated to 90° C. until aromatic amine is no longer detectable after 5 to 6 hours or the amine proportion is no longer diminished to a substantial extent. The dyestuff thus obtained is free of organic chlorine and is separated in the heat by addition of potassium chloride (25%), filtered off with suction, dried and converted into sulfochloride as described in Example 7 with chorosulfonic acid and thionyl chloride and then condensed with β-hydroxyethylamine sufuric acid semi-ester.

The reactive dyestuff thus obtained dyes cotton as described in Example 1 reddish yellow shades of good fastness to light and excellent fastness to wet processing.

By the method described in Example 10 a variety of reddish yellow and orange reactive dyestuffs can be produced, depending upon the amine components which are combined with one another via the trifunctional cyanuric-chloride. Some of the dyestuffs thus obtainable are based on the following substances:

| Amines which are linked with triazinyl radicals in the— | | | Color of the final reactive dyestuff |
|---|---|---|---|
| 1st step | 2nd step | 3rd step | |
| 3-aminobenzenesulfonic acid | Azo dyestuff from diazotized 2-amino-naphthalene-4,8,-disulfonic acid and 1-amino-3-methylbenzene. | 3-aminobenzene-sulfonic acid. | Reddish yellow. |
| Do | Azo dyestuff from diazotized 2-amino-naphthalene-4,8-disulfonic acid and 1-amino-2-methoxybenzene. | Aniline | Do. |
| 4-amino-3,2'-dimethylazobenzene-4',5-disulfonic acid. | Azo dyestuff from diazotized 2-amino-naphthalene-6,8-disulfonic acid and 1-amino-3-methylbenzene. | do | Do. |
| Do | Azo dyestuff from diazotized 2-amino-naphthalene-4,8-disulfonic acid and 1-amino-2-methoxybenzene. | 1-aminonaphthalene | Golden yellow. |
| Azo dyestuff from diazotized 2-amino-naphthalene-4,8-disulfonic acid and 1-amino-2-methyl-5-methoxybenzene. | Azo dyestuff from diazotized 2-amino-naphthalene-4,8-disulfonic acid and 1-amino-2-methyl-5-methoxybenzene. | Aniline | Orange. |
| Azo dyestuff from diazotized 2-amino-naphthalene-6,8-disulfonic acid and 1-amino-2-methyl-5-methoxybenzene. | Azo dyestuff from diazotized 2-amino-naphthalene-6,8-disulfonic acid and 1-amino-2-methyl-5-methoxybenzene. | β-Hydroxyethyl-amine. | Do. |
| Azo dyestuff from diazotized 2-amino-naphthalene-4,8-disulfonic acid and 1-amino-3-methylbenzene. | β-hydroxyethylamine | do | Reddish yellow. |

We claim:
1. A monoazo dyestuff of the formula

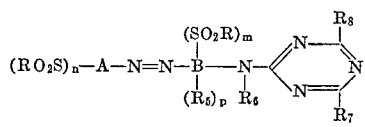

wherein A stands for a radical selected from the group consisting of phenylene and naphthylene nuclei and B stands for phenylene nucleus, R stands for the group —NH—$R_1$—$OSO_3X$, $R_1$ being an alkylene member having 2 to 3 carbon atoms between —N— and —O—, and X is a member selected from the group consisting of hydrogen and an alkali metal cation, $R_5$ stands for a member selected from the group consisting of hydrogen, methyl and methoxy, $R_6$ means a member selected from the group consisting of hydrogen and lower alkyl, $R_7$ and $R_8$ stand for radicals selected from the group consisting of —OH, —$NH_2$, lower alkylamino, hydroxy lower alkylamino, phenylamino, lower alkyl phenylamino,

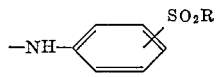

lower alkyl phenylamino carrying a —$SO_2R$ group on the benzene ring, naphthylamino and

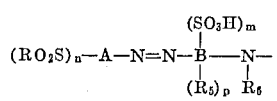

$n$ stands for one of the integers 1 and 2, $m$ stands for one of the integers 0 and 1, and $p$ stands for one of the integers 1 and 2.

2. The monoazo dyestuff which in the free acid state corresponds to the formula

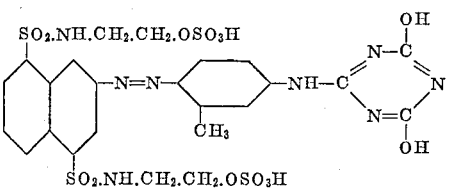

3. The monoazo dyestuff which in the free acid state corresponds to the formula

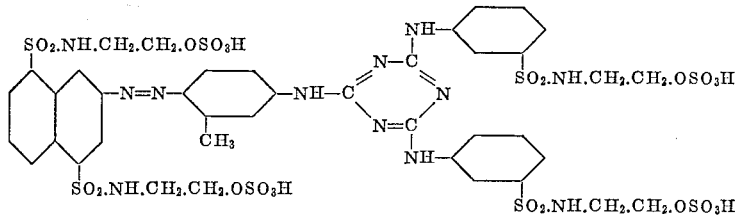

References Cited in the file of this patent
UNITED STATES PATENTS

| | | |
|---|---|---|
| 2,892,830 | Stephen | June 30, 1959 |
| 2,950,165 | Hadfield et al. | Aug. 23, 1960 |

OTHER REFERENCES

Sommer: Amer. Dyestuff Rep., vol. 47, pp. 895 to 897 (1958).